(12) United States Patent
Kumar

(10) Patent No.: US 12,068,629 B2
(45) Date of Patent: Aug. 20, 2024

(54) CONTROLLING CHARGING OF COMPUTING DEVICE THROUGH PORTS CONNECTED TO EXTERNAL DEVICES

(71) Applicant: Dell Products L.P., Round Rock, TX (US)

(72) Inventor: Rajesh Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 893 days.

(21) Appl. No.: 17/106,410

(22) Filed: Nov. 30, 2020

(65) Prior Publication Data
US 2022/0173605 A1    Jun. 2, 2022

(51) Int. Cl.
| | |
|---|---|
| H02J 7/00 | (2006.01) |
| G06F 1/26 | (2006.01) |
| G06F 1/28 | (2006.01) |
| G06F 13/16 | (2006.01) |
| G06F 13/42 | (2006.01) |
| H04L 12/10 | (2006.01) |

(52) U.S. Cl.
CPC ........ *H02J 7/007182* (2020.01); *G06F 1/266* (2013.01); *G06F 1/28* (2013.01); *G06F 13/1668* (2013.01); *G06F 13/4282* (2013.01); *H04L 12/10* (2013.01); *G06F 2213/0042* (2013.01)

(58) Field of Classification Search
CPC .................................................. H02J 7/007182
USPC ........................................................ 320/164
See application file for complete search history.

(56) References Cited

U.S. PATENT DOCUMENTS

| | | | | |
|---|---|---|---|---|
| 2016/0336745 | A1* | 11/2016 | Pandya | .................... H02J 7/342 |
| 2021/0296914 | A1* | 9/2021 | Bourilkov | ........... H02J 7/00034 |

OTHER PUBLICATIONS

Intel Corporation "Thunderbolt 3. The USB-C That Does It All," Technology Brief, 2016, 8 pages.
Dell, "Dell Power Manager User's Guide," Revision A-3, Sep. 2020, 25 pages.
Intel Corporation "Thunderbolt 3. More Speed. More Pixels. More Possibilities." https://www.intel.com/content/www/us/en/products/docs/io/thunderbolt/thunderbolt-overview-brief.html, 2015, 2 pages.

(Continued)

*Primary Examiner* — Eric D Lee
(74) *Attorney, Agent, or Firm* — Ryan, Mason & Lewis, LLP

(57) ABSTRACT

An apparatus comprises at least one processing device configured to obtain information characterizing a status of one or more batteries of a computing device. The processing device is also configured to determine whether at least one connector port of the computing device is connected to one or more external devices, the at least one connector port being configured to receive power from the connected external devices for charging the one or more batteries of the computing device. The processing device is further configured, responsive to determining that the at least one connector port of the computing device is connected to the one or more external devices, to selectively enable the charging of the one or more batteries of the computing device utilizing power received from the connected external devices based at least in part on the information characterizing the status of the one or more batteries of the computing device.

20 Claims, 3 Drawing Sheets

(56) References Cited

OTHER PUBLICATIONS

J. Ziller, "Thunderbolt 3. The USB Type-C That Does It All," https://thunderbolttechnology.net/sites/default/files/IDF16_TBT3_SF16_CONBZ03_102f.pdf, 2016, 45 pages.

Dell, "Guide to Dell Power Manager," https://www.dell.com/support/article/en-us/sln318026/guide-to-dell-power-manager?lang=en, Jun. 19, 2020, 7 pages.

* cited by examiner

CONTROLLING CHARGING OF COMPUTING DEVICE THROUGH PORTS CONNECTED TO EXTERNAL DEVICES

FIELD

The field relates generally to computing devices, and more particularly to techniques for managing batteries of computing devices.

BACKGROUND

Various computing devices are equipped with batteries to enable portable or mobile computing. Some types of batteries, such as lithium-ion (Li-ion)-based batteries widely used in laptop computing devices, need care to preserve battery health over their associated lifespan. Battery lifespan can be damaged by self-heating during charging, as well as from heat generated by other components within an enclosure or other housing. For example, laptop computing devices may be designed to be small and portable, such that components thereof, including a processor and the battery, are in close proximity. During periods of high usage when the processor is heavily utilized, significant heat is generated that can potentially affect the health of the battery and other components of the laptop computing device. Such effects are compounded when the battery is charging and thus also self-heating.

SUMMARY

Illustrative embodiments of the present invention provide techniques for selectively enabling charging of batteries of a computing device through ports connecting the computing device to one or more external devices.

In one embodiment, an apparatus comprises at least one processing device comprising a processor coupled to a memory. The at least one processing device is configured to perform the steps of obtaining information characterizing a status of one or more batteries of a computing device and determining whether at least one connector port of the computing device is connected to one or more external devices, the at least one connector port being configured to receive power from the connected one or more external devices for charging the one or more batteries of the computing device. The at least one processing device is also configured to perform the step of, responsive to determining that the at least one connector port of the computing device is connected to the one or more external devices, selectively enabling the charging of the one or more batteries of the computing device utilizing power received from the connected one or more external devices based at least in part on the obtained information characterizing the status of the one or more batteries of the computing device.

These and other illustrative embodiments include, without limitation, methods, apparatus, networks, systems and processor-readable storage media.

DETAILED DESCRIPTION

Figure 1:
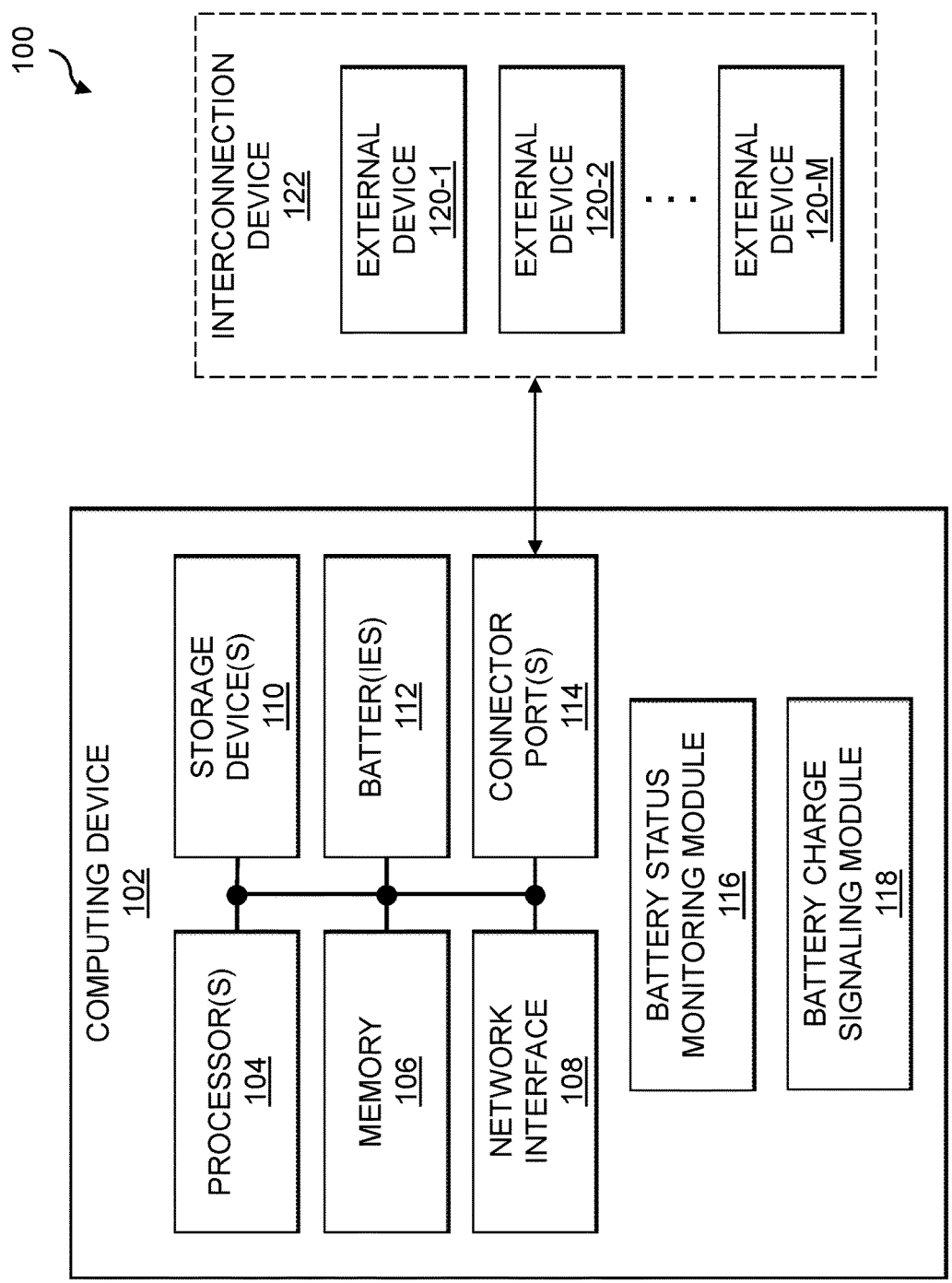
FIG. 1 is a block diagram of an information processing system for selectively enabling charging of batteries of a computing device through ports connecting the computing device to one or more external devices in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As noted above, various computing devices are equipped with batteries to enable portable or mobile computing, including laptop computing devices (also referred to herein as laptops). The usefulness of a laptop or other computing device may in some cases be defined by how long it is able to perform, which is dependent on battery life. The laptop or other computing device can also be defined by how much it is able to perform (e.g., by processor speed). High performance or high usage will typically stress the battery, and thus there is a direct dependency between performance and battery health.

Some types of batteries, such as lithium-ion (Li-ion)-based batteries widely used in laptop computing devices, need care to preserve battery health over its associated lifespan. Battery lifespan can be damaged by self-heating during charging, as well as from heat generated by other components within an enclosure or other housing. For example, laptop computing devices may be designed to be small and portable, such that components thereof including a processor and the battery are in close proximity. During periods of high usage when the processor is heavily utilized, significant heat is generated that can potentially affect the health of the battery and other components of a laptop computing device. Such effects are compounded when the battery is charging and thus also self-heating.

In some cases, a laptop computing device or other type of computing device equipped with one or more batteries may be connected to one or more external devices. Such external devices may include, but are not limited to, monitors and other displays, speaker systems, mice, keyboards or other input devices, Bluetooth devices, etc. Such connection to external devices may be through a docking station, which is another example of an external device that facilitates interconnection between a computing device and one or more additional external devices. Some external devices may be connected to a computing device through a port or connector that charges the computing device in addition to exchanging data and signaling between the computing device and the external devices. For example, Universal Serial Bus (USB)/Thunderbolt type connectors may connect a computing device such as a laptop to one or more external devices while also charging that device.

Consider, as an example, a laptop computing device that is connected to an external docking station via a USB/Thunderbolt type connector. The USB/Thunderbolt type connector is in turn connected to one or more external devices, such as monitors or other displays, sound systems, Bluetooth devices, etc. The USB/Thunderbolt type connector also charges the laptop continuously while connected to such external devices. This can result in heavy heating of the laptop as well as degraded performance issues. In some cases, this can cause integrated circuits on a motherboard of the laptop from being burnt on account of the battery or batteries in the laptop bulging and potentially bursting inside the laptop. Not only does this negatively affect performance, it also presents a safety hazard. This can result in more part replacement, negative impacts to the reputation of a manufacturer or supplier of the laptop, etc.

Some laptops and other computing devices include Basic Input-Output System (BIOS) firmware or software controls for power usage management. Such controls, as an example, may be used to set reduced power consumption modes (e.g., 7.5 Watt, 15 Watt, etc.). Some computing devices also include Operating System (OS) controls, such as drivers, software, etc. (e.g., a Power Manager), that controls the on time that a system has to charge. However, this assumes that it is desired to leave the system online, or is used only during that time. Typically, the only way to stop USB/Thunderbolt from continuously charging the laptop or other computing device is by unplugging any external devices connected to it. This lets the computing device cool for a time, but as the external devices are unplugged, the external devices cannot be used. This is not an ideal solution for end-users that desire externally-connected devices be accessible as long as the laptop or other computing device is turned on.

Illustrative embodiments provide techniques for intelligent management of external power charging. Some embodiments advantageously utilize intelligent threshold management controlled via software and hardware of connectors and ports of a computing device, including but not limited to USB/Thunderbolt type connectors. In some embodiments, port controller and power controller drivers of a computing device exchange alerts for selectively enabling and disabling charging via different ports and connectors of the computing device. For example, USB/Thunderbolt controller drivers may exchange alerts with power controller drivers of the computing device for external charging via USB/Thunderbolt. For a computing device running a Windows OS, the Windows Power Kernel drivers may be utilized to set minimum and maximum thresholds for controlling when to enable and disable external charging via USB/Thunderbolt ports. If the computing device hits a designated maximum charging threshold (e.g., 90% charge), then the computing device would automatically stop drawing power from external devices via USB/Thunderbolt connections. Once the computing device hits a designated minimum charging threshold (e.g., 20%), then the computing device would automatically start drawing power from external devices via USB/Thunderbolt connections. This may be controlled via a Power Manager intelligently, with hardware assistance as described in further detail below. Since USB/Thunderbolt connections are typically connected to the motherboard of a computing device directly, the power consumption control may be controlled via a combination of hardware and software of the computing device. A Power Manager controller of the computing device may determine the charge availability in the computing device, and send indications to a USB/Thunderbolt controller to start and stop the intake of power from external devices via USB/Thunderbolt connections. A system tray or icon in a dashboard or control panel of the computing device may indicate that the battery has a charging status of "plugged in, not charging" or indicate that nothing is plugged in when the charge status is between the minimum and maximum thresholds.

FIG. 1 illustrates a system 100 including a computing device 102 configured for selectively enabling charging of batteries 112 of the computing device 102 through ports 114 connecting the computing device 102 to one or more external devices 120 and an optional interconnection device 122 (which, as discussed in further detail below, may also be viewed as an external device). In the description below, it is assumed that the computing device 102 is a laptop computing device. As noted above, however, various other types of computing devices may be configured for intelligent control of charging through ports connecting the computing devices to external devices. The computing device 102 comprises one or more processors 104 coupled to a memory 106, network interface circuitry 108, and one or more storage devices 110.

Each of the one or more processors 104 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 106 may comprise random access memory (RAM), read-only memory (ROM), flash memory or other types of memory, in any combination. The memory 106 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

The network interface circuitry 108 is used to interface the computing device 102 with a network (not shown), and may comprise conventional transceivers. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The storage devices 110 may comprise solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices.

Accordingly, numerous other types of electronic or magnetic media can be used in implementing at least a subset of the storage devices 110.

The processors 104, memory 106, network interface circuitry 108 and storage devices 110 are part of at least one processing device that is illustratively disposed within a housing of the computing device 102. The computing device 102 further includes one or more batteries 112 configured to provide electrical power to the computing device 102. In the description below, it is assumed that the batteries 112 are Li-ion batteries, each of which may be made of multiple cells. Each of the cells of a Li-ion battery may hold approximately 3.9-4.1 Volts (V). In some cases, a laptop utilizes 6 cells to get a desired voltage and current. Multiple battery cells may be connected in series to achieve a desired operational voltage, and sets of cells connected in series may be connected in parallel to achieve a desired current and more power (e.g., in terms of wattage).

The computing device 102 also includes one or more connector ports 114 communicatively coupled to the processors 104, batteries 112 and possibly other components of the computing device 102. At least one of the connector ports 114 is assumed to comprise a connector port that is capable of drawing power from an externally-connected device. For example, such a connector port may be a USB/Thunderbolt type connector port. The connector ports 114 are illustratively shown as connected to a set of external devices 120-1, 120-2, . . . 120-M (collectively, external devices 120). As noted above, the external devices 120 may include one or more monitors or external displays, speaker systems, input devices (e.g., a mouse, keyboard, etc.), Bluetooth devices, etc. In some cases, one or more of the external devices 120 are coupled to the connector ports 114 via an interconnection device 122. The interconnection device 122 may comprise, for example, a docking station that connects to the connector port 114 and additional connector ports of one or more of the external devices 120. The interconnection device 122 may itself be viewed as an external device.

The computing device 102 is configured to implement a number of functional modules for providing intelligent control of charging of the batteries 112 utilizing power from external devices 120, 122 connected via ports 114. Such functional modules include a battery status monitoring module 116 and a battery charge signaling module 118. The battery status monitoring module 116 is configured to obtain information characterizing a status of the one or more batteries 112 of the computing device 102, such as a charge level of the one or more batteries 112. The battery charge signaling module 118 is configured to determine whether at least one connector port 114 of the computing device is connected to one or more external devices 120, 122, where the at least one connector port 114 is configured to receive power from the connected one or more external devices 120, 122 for charging the one or more batteries 112 of the computing device 102. Responsive to determining that the at least one connector port 114 of the computing device 102 is connected to the one or more external devices 120, 122, the battery charge signaling module 118 is configured to selectively enable the charging of the one or more batteries 112 of the computing device 102 utilizing power received from the connected one or more external devices 120, 122 based at least in part on the information characterizing the status of the one or more batteries 112 of the computing device 102 obtained using the battery status monitoring module 116.

At least portions of the battery status monitoring module 116 and the battery charge signaling module 118 may be implemented at least in part in the form of software that is stored in memory 106 and executed by one or more of the processors 104. It should also be appreciated that the functionality of the battery status monitoring module 116 and the battery charge signaling module 118 may be implemented by another computing or processing device that is distinct from computing device 102. For example, the functionality of one or both of the battery status monitoring module 116 and the battery charge signaling module 118 may be provided by an application or service hosted in a cloud computing platform, at least in part using one or more of the external devices 120 and/or interconnection device 122, etc.

It is to be understood that the particular set of elements shown in FIG. 1 for selectively enabling charging of batteries of a computing device through ports connecting the computing device to one or more external devices is presented by way of illustrative example only, and in other embodiments additional or alternative elements may be used. Thus, another embodiment may include additional or alternative components within the computing device 102, as well as different arrangements of modules and other components.

It is to be appreciated that these and other features of illustrative embodiments are presented by way of example only, and should not be construed as limiting in any way.

Figure 2:
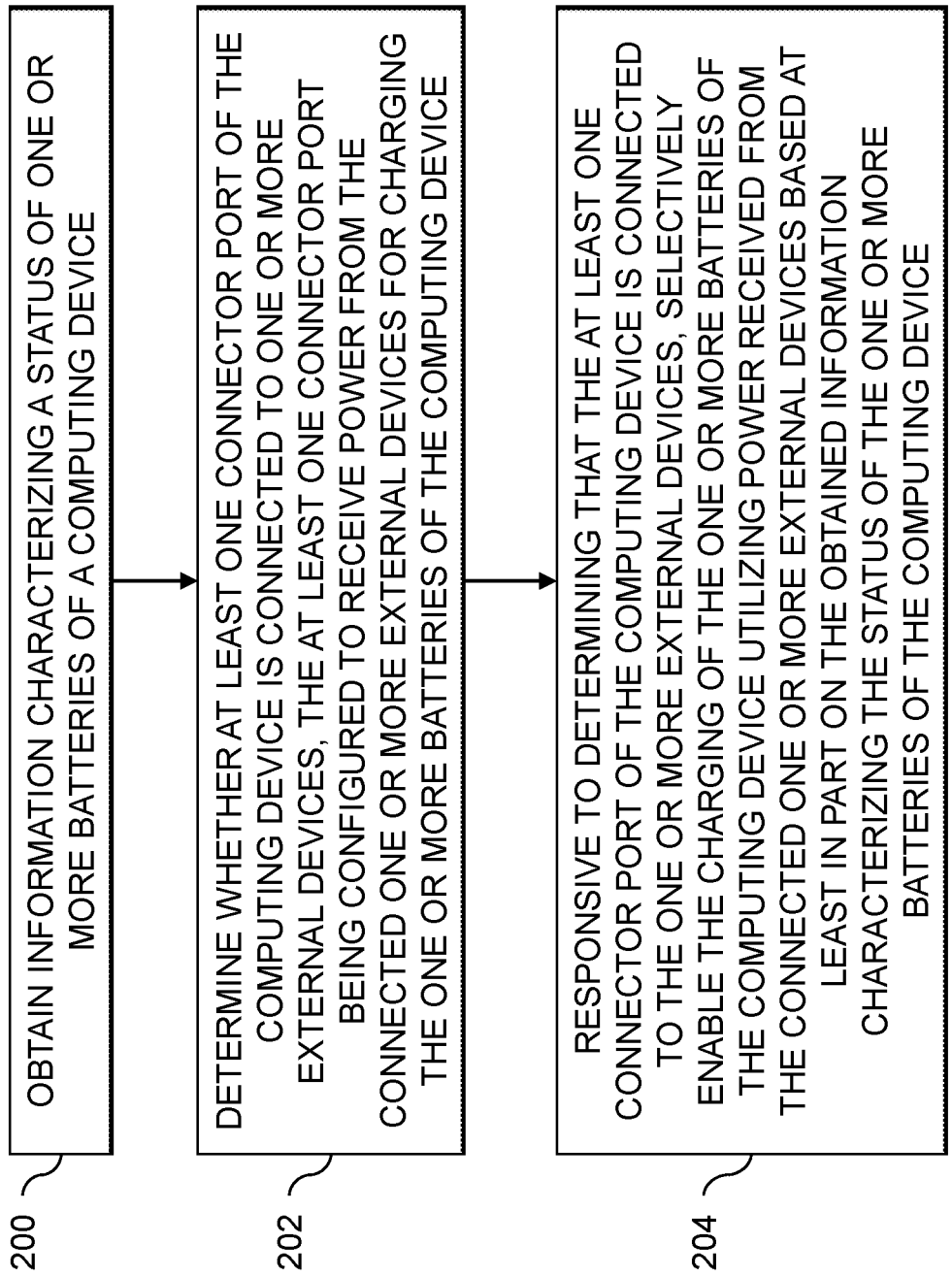
FIG. 2 is a flow diagram of an exemplary process for selectively enabling charging of batteries of a computing device through ports connecting the computing device to one or more external devices in an illustrative embodiment.

An exemplary process for selectively enabling charging of batteries of a computing device through ports connecting the computing device to one or more external devices will now be described in more detail with reference to the flow diagram of FIG. 2. It is to be understood that this particular process is only an example, and that additional or alternative processes for selectively enabling charging of batteries of a computing device through ports connecting the computing device to one or more external devices may be used in other embodiments.

In this embodiment, the process includes steps 200 through 204. These steps are assumed to be performed by the computing device 102 utilizing the battery status monitoring module 116 and the battery charge signaling module 118. The process begins with step 200, obtaining information characterizing a status of the one or more batteries 112 of the computing device 102. The information characterizing the status of the one or more batteries 112 of the computing device 102 may be received from an operating system kernel power manager of the computing device 102. The operating system kernel power manager of the computing device 102 may be configured to receive one or more battery status alerts for the one or more batteries 112 of the computing device 102 from a driver stack of the computing device 102. The driver stack of the computing device 102 may comprise a Universal Serial Bus (USB) extensible host controller driver and one or more battery port drivers.

In step 202, a determination is made as to whether at least one of the connector ports 114 of the computing device 102 are connected to one or more external devices 120, 122. The at least one connector port 114 may comprise a Universal Serial Bus (USB) connector port, such as a USB type C connector port, a Thunderbolt type connector port, combinations thereof. The connected one or more external devices 120 may comprise at least one of an external display, a speaker system, an input device and a Bluetooth device. The connected one or more external devices may comprise a docking station or other type of interconnection device 122 connecting the computing device 102 to one or more additional external devices 120. The at least one connector port 114 is configured to receive power from the connected one or more external devices for charging the one or more batteries 112 of the computing device 102.

Responsive to determining that the at least one connector port 114 of the computing device 102 is connected to the one or more external devices 120, 122, the charging of the one or more batteries 112 of the computing device 102 utilizing power received from the connected one or more external devices 120, 122 is selectively enabled in step 204 based at least in part on the obtained information characterizing the status of the one or more batteries 112 of the computing device 102.

Step 204 may include disabling charging of the one or more batteries 112 of the computing device 102 utilizing power received from the connected one or more external devices 120, 122 without unplugging the one or more external devices 120, 122 from the at least one connector port 114. Step 204 may include disabling charging of the one or more batteries 112 of the computing device 102 utilizing power received from the connected one or more external devices 120, 122 responsive to the obtained information characterizing the status of the one or more batteries 112 of the computing device 102 indicating that a charge level of the one or more batteries 112 exceeds a designated threshold charge level. This may include setting a battery status indicator in a dashboard of an operating system of the computing device 102 to a status indicating that the connected one or more external devices 120, 122 are plugged in but not charging the one or more batteries 112 of the computing device 102. Step 204 may also or alternatively include enabling charging of the one or more batteries 112 of the computing device 102 utilizing power received from the connected one or more external devices 120, 122 responsive to the obtained information characterizing the status of the one or more batteries 112 of the computing device 102 indicating that a charge level of the one or more batteries 112 is below another designated threshold charge level.

As described above, techniques for dynamic and intelligent power control can be applied to any laptop or other computing device that utilizes connector ports configured for receiving power from an external device. In the description below, it is assumed that the connector ports of a computing device are Thunderbolt 3/USB Type-3 connectors. The Thunderbolt 3/USB Type-3 connectors may utilize the Intel Thunderbolt 3 controller, which has multiple modes of operating including: USB only; DisplayPort only; DisplayPort and USB Multi-Function mode; Thunderbolt 3 mode; and Thunderbolt networking mode. Each of these modes has additional functionality for requesting charge over the connector from a device or adapter designed for delivering power to the computing device (e.g., up to 100 Watts) via USB Power Delivery (USB-PD) specifications. In this way, it is possible for the Thunderbolt 3 enabled USB-C connector to support charging, display, data, or all three at the same time in various configurations.

USB-PD has a feature for optimizing power management across multiple peripherals by allowing each device to take only the power it requires, and to get more power when required for a given application. However, if the power receiving computing device does not indicate that it no longer needs power (e.g., when the battery is full, or at some designated threshold level of charge), it continues powering the computing device. This is what happens, for example, when a computing device is charged via a USB/Thunderbolt type port, which also extends the display to a monitor and connects other accessories or external devices via a docking station. This constant charging can lead to battery health deteriorating, battery bulging (e.g., which in turn may lead to a front enclosing of a housing of the computing device opening due to the battery's physical size being increased), motherboard solder being damaged, etc., which can present a safety hazard. Illustrative embodiments use intelligent control of the power supply of a computing device to stop its batteries being charged via USB-PD and a Thunderbolt 3/USB Type-C connector.

Computing devices such as laptops running Windows OS platforms are expected to expose their batteries and charging subsystem through the Advanced Configuration and Power Interface (ACPI) Control Method Battery interface. In addition, the ACPI interfaces provides events to enable the hardware platform to notify the Windows OS of battery and power source changes, such as a transition from AC to battery power. The Windows OS Power Manager periodically requests status information from the batteries of the computing device, where such status information may include the remaining charge capacity of the batteries, the current rate of drain of the batteries, etc. This request may originate in the Power Manager itself, a higher-level user interface component, or in an application. The Power Manager turns the request into an I/O request packet (IRP) to the battery device, which is then turned into the appropriate control method by the Windows control-method battery driver (e.g., Cmbatt.sys). The method executes, and the result is returned up the driver stack.

At the OS level, Windows utilizes the ACPI battery control firmware alert mechanism, and battery status (BST) returns package values to determine the current status of the battery (e.g., battery state, remaining capacity, present voltage, etc.), and the system detects when the battery hits 100% charging or some other designated threshold charge level. This alerting mechanism to the Thunderbolt Controller may be used to stop charging the computing device. Further, additional signals may be sent to the Thunderbolt Controller to charge again when the battery percentage goes below another designated charge level. In this way, embodiments are able to efficiently control the charging of the computing device, at the same time continuing to plug in external devices to the connector (e.g., for extending display to an external monitor, connecting to speaker systems, input device, Bluetooth devices, docking stations, etc.).

In some embodiments, a Thunderbolt/USB Type C Power Controller is used with or implemented in a Power Manager (e.g., a Dell Power Manager), which will listen to alerts from the Windows Kernel Power Manager. Based on the power low versus high capacity and comparison to designated thresholds (e.g., which may be configured by default, which may be user-configurable, etc.), the Thunderbolt/USB Type C Power Controller will signal the Thunderbolt Controller Driver to start and stop charging the computing device. For example, charging will stop when the device hits a first designated threshold (e.g., 90% charge). Once the charge level drops below a second designated threshold (e.g., 20% charge), another signal is sent to start charging again. The USB/Thunderbolt charging is thus controlled without the need for removing or disconnecting plugs and connectors for external devices which would undesirably rend the external devices inaccessible.

Figure 3:
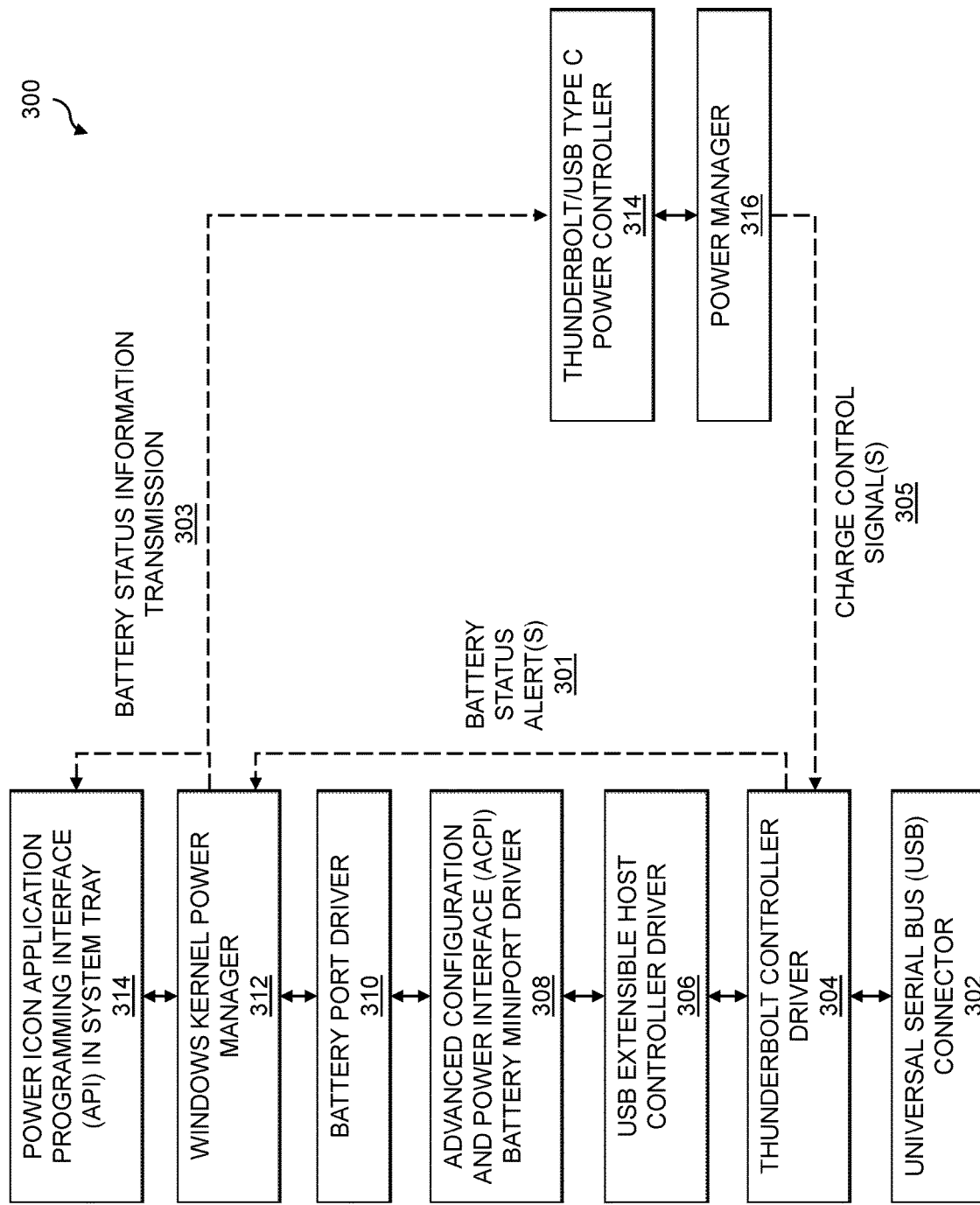
FIG. 3 shows a system of software modules of a computing device that enable intelligent control of charging from external devices connected to ports of a computing device in an illustrative embodiment.

FIG. 3 shows an example system 300 of software modules of a computing device that enable intelligent control of charging from external devices connected to the computing device via Thunderbolt/USB Type-C connector ports. The system 300 includes a USB connector 302, which is connected to a Thunderbolt Controller driver 304 (e.g., an Intel® JHL6340 Thunderbolt 3 Controller driver). The Thunderbolt Controller driver 304 is connected to a USB Extensible Host Controller driver 306, which is in turn connected to an ACPI Battery Miniport driver 308 (e.g., cmbatt.sys). The ACPI Battery Miniport driver 308 is connected to a Battery Port driver 310 (e.g., battc.sys). The Battery Port driver 310 is connected to a Windows Kernel Power Manager 312, which is connected to a power icon API in a system tray 314 running in the OS of the computing device. The system 300 also includes a Thunderbolt/USB Type C Power Controller 314 and a Power manager 316. Battery status alerts 301 are propagated through the chain of drivers (e.g., the Thunderbolt Controller driver 304, the USB Extensible Host Controller driver 306, the ACPI Battery Miniport driver 308, and the Battery Port Driver 310) to the Windows Kernel Power Manager 312. The Windows Kernel Power Manager 312 transmits battery status information 303 determined from the battery status alerts 301 to the power icon API in the system tray 314 and to the Thunderbolt/USB Type C Power Controller 314. The Thunderbolt/USB Type C Power Controller 314 provides such information 303 to the Power Manager 316, which communicates charge control signals 305 back to the Thunderbolt Controller Driver 304 (e.g., to stop charging when the battery charge reaches a first designated threshold, to being charging when the battery charge drops below a second designated threshold, etc.).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It should again be emphasized that the above-described embodiments are presented for purposes of illustration only. Many variations and other alternative embodiments may be used. For example, the disclosed techniques are applicable to a wide variety of other types of information processing systems, container platforms, machine learning algorithms, clustering algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        obtaining information characterizing a status of one or more batteries of a computing device;
        determining whether at least one connector port of the computing device is connected to one or more external devices, the at least one connector port being configured (i) to receive power from the connected one or more external devices for charging the one or more batteries of the computing device and (ii) to transfer data between the computing device and the connected one or more external devices; and
        responsive to determining that the at least one connector port of the computing device is connected to the one or more external devices, selectively enabling the charging of the one or more batteries of the computing device utilizing power received from the connected one or more external devices based at least in part on the obtained information characterizing the status of the one or more batteries of the computing device, wherein selectively enabling the charging of the one or more batteries of the computing device utilizing power received from the connected one or more external devices is performed while maintaining data transfer functionality between the computing device and the connected one or more external devices, and wherein the connected one or more external devices comprise at least one of one or more peripheral devices and a docking station connecting at least one of the one or more peripheral devices to the computing device.

2. The apparatus of claim 1 wherein selectively enabling the charging of the one or more batteries of the computing device utilizing power received from the connected one or more external devices comprises disabling charging of the one or more batteries of the computing device utilizing power received from the connected one or more external devices without unplugging the one or more external devices from the at least one connector port.

3. The apparatus of claim 1 wherein selectively enabling the charging of the one or more batteries of the computing device utilizing power received from the connected one or more external devices comprises disabling charging of the one or more batteries of the computing device utilizing power received from the connected one or more external devices responsive to the obtained information characterizing the status of the one or more batteries of the computing device indicating that a charge level of the one or more batteries exceeds a designated threshold charge level.

4. The apparatus of claim 3 wherein disabling charging of the one or more batteries of the computing device utilizing power received from the connected one or more external devices comprises setting a battery status indicator in a dashboard of an operating system of the computing device to a status indicating that the connected one or more external devices are plugged in but not charging the one or more batteries of the computing device.

5. The apparatus of claim 1 wherein selectively enabling the charging of the one or more batteries of the computing device utilizing power received from the connected one or more external devices comprises enabling charging of the one or more batteries of the computing device utilizing power received from the connected one or more external devices responsive to the obtained information characterizing the status of the one or more batteries of the computing device indicating that a charge level of the one or more batteries is below a designated threshold charge level.

6. The apparatus of claim 1 wherein the at least one connector port comprises a Universal Serial Bus (USB) connector port.

7. The apparatus of claim 6 wherein the USB connector port comprises a USB type C connector port.

8. The apparatus of claim 6 wherein the USB connector port comprises a Thunderbolt type connector port.

9. The apparatus of claim 1 wherein the computing device comprises a laptop computing device.

10. The apparatus of claim 1 wherein the information characterizing the status of the one or more batteries of the computing device is received from an operating system kernel power manager of the computing device.

11. The apparatus of claim 10 wherein the operating system kernel power manager of the computing device is configured to receive one or more battery status alerts for the one or more batteries of the computing device from a driver stack of the computing device.

12. The apparatus of claim 11 wherein the driver stack of the computing device comprises a Universal Serial Bus (USB) extensible host controller driver and one or more battery port drivers.

13. The apparatus of claim 1 wherein the one or more peripheral devices comprise at least one of an external display, a speaker system, an input device and a Bluetooth device.

14. The apparatus of claim 1 wherein the connected one or more external devices comprise the docking station.

15. A computer program product comprising a non-transitory processor-readable storage medium having stored therein program code of one or more software programs, wherein the program code when executed by at least one processing device causes the at least one processing device to perform steps of:
obtaining information characterizing a status of one or more batteries of a computing device;
determining whether at least one connector port of the computing device is connected to one or more external devices, the at least one connector port being configured (i) to receive power from the connected one or more external devices for charging the one or more batteries of the computing device and (ii) to transfer data between the computing device and the connected one or more external devices; and
responsive to determining that the at least one connector port of the computing device is connected to the one or more external devices, selectively enabling the charging of the one or more batteries of the computing device utilizing power received from the connected one or more external devices based at least in part on the obtained information characterizing the status of the one or more batteries of the computing device, wherein selectively enabling the charging of the one or more batteries of the computing device utilizing power received from the connected one or more external devices is performed while maintaining data transfer functionality between the computing device and the connected one or more external devices, and wherein the connected one or more external devices comprise at least one of one or more peripheral devices and a docking station connecting at least one of the one or more peripheral devices to the computing device.

16. The computer program product of claim 15 wherein selectively enabling the charging of the one or more batteries of the computing device utilizing power received from the connected one or more external devices comprises disabling charging of the one or more batteries of the computing device utilizing power received from the connected one or more external devices responsive to the obtained information characterizing the status of the one or more batteries of the computing device indicating that a charge level of the one or more batteries exceeds a designated threshold charge level.

17. The computer program product of claim 15 wherein selectively enabling the charging of the one or more batteries of the computing device utilizing power received from the connected one or more external devices comprises enabling charging of the one or more batteries of the computing device utilizing power received from the connected one or more external devices responsive to the obtained information characterizing the status of the one or more batteries of the computing device indicating that a charge level of the one or more batteries is below a designated threshold charge level.

18. A method comprising steps of:
obtaining information characterizing a status of one or more batteries of a computing device;
determining whether at least one connector port of the computing device is connected to one or more external devices, the at least one connector port being configured (i) to receive power from the connected one or more external devices for charging the one or more batteries of the computing device and (ii) to transfer data between the computing device and the connected one or more external devices; and
responsive to determining that the at least one connector port of the computing device is connected to the one or more external devices, selectively enabling the charging of the one or more batteries of the computing device utilizing power received from the connected one or more external devices based at least in part on the obtained information characterizing the status of the one or more batteries of the computing device, wherein selectively enabling the charging of the one or more batteries of the computing device utilizing power received from the connected one or more external devices is performed while maintaining data transfer functionality between the computing device and the connected one or more external devices, and wherein the connected one or more external devices comprise at least one of one or more peripheral devices and a docking station connecting at least one of the one or more peripheral devices to the computing device;
wherein the method is performed by at least one processing device comprising a processor coupled to a memory.

19. The method of claim 18 wherein selectively enabling the charging of the one or more batteries of the computing device utilizing power received from the connected one or more external devices comprises disabling charging of the one or more batteries of the computing device utilizing power received from the connected one or more external devices responsive to the obtained information characterizing the status of the one or more batteries of the computing device indicating that a charge level of the one or more batteries exceeds a designated threshold charge level.

20. The method of claim 18 wherein selectively enabling the charging of the one or more batteries of the computing device utilizing power received from the connected one or more external devices comprises enabling charging of the one or more batteries of the computing device utilizing power received from the connected one or more external devices responsive to the obtained information characterizing the status of the one or more batteries of the computing device indicating that a charge level of the one or more batteries is below a designated threshold charge level.

* * * * *